US011947901B2

(12) United States Patent
McGuire (10) Patent No.: US 11,947,901 B2
(45) Date of Patent: Apr. 2, 2024

(54) METHOD AND SYSTEM FOR AUTOMATED DATA CURATION

(71) Applicant: JPMorgan Chase Bank, N.A., New York, NY (US)

(72) Inventor: Trevor McGuire, Townsend, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/810,750

(22) Filed: Jul. 5, 2022

(65) Prior Publication Data

US 2024/0012982 A1 Jan. 11, 2024

(51) Int. Cl.
*G06F 40/166* (2020.01)
*G06F 40/126* (2020.01)
*G06F 40/143* (2020.01)
*G06F 40/279* (2020.01)

(52) U.S. Cl.
CPC .......... *G06F 40/166* (2020.01); *G06F 40/126* (2020.01); *G06F 40/143* (2020.01); *G06F 40/279* (2020.01)

(58) Field of Classification Search
None
See application file for complete search history.

(56) References Cited

U.S. PATENT DOCUMENTS

| 11,256,659 | B1* | 2/2022 | Gu | G06F 16/144 |
| 2007/0129960 | A1* | 6/2007 | Farrell | G06Q 10/10 |
| | | | | 379/93.06 |
| 2018/0165758 | A1* | 6/2018 | Saxena | G06N 20/00 |
| 2019/0139132 | A1* | 5/2019 | Meng | G06Q 40/04 |
| 2019/0286676 | A1* | 9/2019 | Fatzinger | G06F 40/56 |
| 2019/0354544 | A1* | 11/2019 | Hertz | G06F 16/338 |
| 2020/0076538 | A1* | 3/2020 | Soultan | G06N 20/00 |
| 2020/0402625 | A1* | 12/2020 | Aravamudan | G06F 21/6245 |
| 2021/0192126 | A1* | 6/2021 | Gehrmann | G06F 40/284 |

* cited by examiner

*Primary Examiner* — Ariel Mercado
(74) *Attorney, Agent, or Firm* — Greenblum & Bernstein, P.L.C.

(57) ABSTRACT

A method for facilitating automated data curation in real-time is disclosed. The method includes retrieving electronic documents from a source; converting the electronic documents into data sets, the data sets corresponding to a predetermined format; preprocessing the data sets to identify linguistic units, the linguistic units relating to paragraphs and sentences; extracting, by using a model, attributes based on the linguistic units, the attributes relating to a key detail in the electronic documents; and generating, in real-time, messages based on the extracted attributes. Additionally, the electronic documents include a corporate action prospectus that provides information for a corresponding corporate event, the information including term and condition information, date information, and restriction information.

20 Claims, 4 Drawing Sheets

METHOD AND SYSTEM FOR AUTOMATED DATA CURATION

BACKGROUND

1. Field of the Disclosure

This technology generally relates to methods and systems for curating data, and more particularly to methods and systems for facilitating automated curation of prospectus and narrative data in real-time by using natural language processing, expression patterns, and scoring algorithms.

2. Background Information

Many financial institutions provide important information via message narratives such as, for example, MT564 messages and MT568 messages to account owners. Often, the message narratives correspond to corporate action prospectuses of upcoming corporate action events. Historically, implementations of conventional data curation techniques for generating the message narratives have resulted in varying degrees of success with respect to effective resource usage and timely generation of the message narratives.

One drawback of using the conventional data curation techniques is that in my instances, the complex corporate action prospectuses are lengthy and includes uncommon verbiage. As a result, large resource allocations are required to curate the message narratives with pertinent information from the complex corporate action prospectuses. Additionally, due to the complexity of the corporate action prospectuses, timely curation of the message narratives is not feasible with reasonable resource allocations.

Therefore, there is a need to automatically curate corporate action prospectuses and message narratives in real-time by using natural language processing, expression patterns, and scoring algorithms.

SUMMARY

The present disclosure, through one or more of its various aspects, embodiments, and/or specific features or sub-components, provides, inter alia, various systems, servers, devices, methods, media, programs, and platforms for facilitating automated curation of prospectus and narrative data in real-time by using natural language processing, expression patterns, and scoring algorithms.

According to an aspect of the present disclosure, a method for facilitating automated data curation in real-time is disclosed. The method is implemented by at least one processor. The method may include retrieving at least one electronic document from a source; converting the at least one electronic document into at least one data set, the at least one data set may correspond to a predetermined format; preprocessing the at least one data set to identify at least one linguistic unit, the at least one linguistic unit may relate to at least one from among a paragraph and a sentence; extracting, by using at least one model, at least one attribute based on the at least one linguistic unit, the at least one attribute may relate to a key detail in the at least one electronic document; and generating, in real-time, at least one message based on the extracted at least one attribute.

In accordance with an exemplary embodiment, the at least one electronic document may include a corporate action prospectus that provides information for a corresponding corporate event, the information may include at least one from among term and condition information, date information, and restriction information.

In accordance with an exemplary embodiment, the predetermined format may include a machine-readable text format that is automatically processable by a computing device, the machine-readable text format may include textual data in a markup language that facilitates recognition by the computing device.

In accordance with an exemplary embodiment, to preprocess the at last one data set, the method may further include standardizing character spacing in the at least one data set; and removing at least one non-standard textual character from the at least one data set.

In accordance with an exemplary embodiment, the standardizing may relate to an optically consistent adjustment to each of the at least one linguistic unit to change a visual density of textual data.

In accordance with an exemplary embodiment, the at least one non-standard textual character may be determined based on at least one from among a character encoding guideline for electronic communication and a character compliance guideline for financial messages.

In accordance with an exemplary embodiment, to extract the at least one attribute, the method may further include identifying, by using the at least one model, the at least one attribute from the at least one linguistic unit based on at least one from among a predetermined expression pattern and a keyword lookup; scoring, by using the at least one model, each of the at least one identified attribute based on at least one predetermined criterion, the at least one predetermined criterion may include at least one from among a keyword hit criterion, a context criterion, a word clustering criterion, and a word embedding criterion; and extracting the identified at least one attribute based on a result of the scoring and at least one predetermined scoring threshold.

In accordance with an exemplary embodiment, the at least one message may relate to a message narrative that includes information corresponding to a corporate action event, the information may include at least one from among election information, entitlement information, and event instruction information.

In accordance with an exemplary embodiment, the at least one model may include at least one from among a natural language processing model, a machine learning model, a mathematical model, a process model, and a data model.

According to an aspect of the present disclosure, a computing device configured to implement an execution of a method for facilitating automated data curation in real-time is disclosed. The computing device including a processor; a memory; and a communication interface coupled to each of the processor and the memory, wherein the processor may be configured to retrieve at least one electronic document from a source; convert the at least one electronic document into at least one data set, the at least one data set may correspond to a predetermined format; preprocess the at least one data set to identify at least one linguistic unit, the at least one linguistic unit may relate to at least one from among a paragraph and a sentence; extract, by using at least one model, at least one attribute based on the at least one linguistic unit, the at least one attribute may relate to a key detail in the at least one electronic document; and generate, in real-time, at least one message based on the extracted at least one attribute.

In accordance with an exemplary embodiment, the at least one electronic document may include a corporate action prospectus that provides information for a corresponding corporate event, the information may include at least one from among term and condition information, date information, and restriction information.

In accordance with an exemplary embodiment, the predetermined format may include a machine-readable text format that is automatically processable by the computing device, the machine-readable text format may include textual data in a markup language that facilitates recognition by the computing device.

In accordance with an exemplary embodiment, to preprocess the at least one data set, the processor may be further configured to standardize character spacing in the at least one data set; and remove at least one non-standard textual character from the at least one data set.

In accordance with an exemplary embodiment, the standardizing may relate to an optically consistent adjustment to each of the at least one linguistic unit to change a visual density of textual data.

In accordance with an exemplary embodiment, the processor may be further configured to determine the at least one non-standard textual character based on at least one from among a character encoding guideline for electronic communication and a character compliance guideline for financial messages.

In accordance with an exemplary embodiment, to extract the at least one attribute, the processor may be further configured to identify, by using the at least one model, the at least one attribute from the at least one linguistic unit based on at least one from among a predetermined expression pattern and a keyword lookup; score, by using the at least one model, each of the at least one identified attribute based on at least one predetermined criterion, the at least one predetermined criterion may include at least one from among a keyword hit criterion, a context criterion, a word clustering criterion, and a word embedding criterion; and extract the identified at least one attribute based on a result of the scoring and at least one predetermined scoring threshold.

In accordance with an exemplary embodiment, the at least one message may relate to a message narrative that includes information corresponding to a corporate action event, the information may include at least one from among election information, entitlement information, and event instruction information.

In accordance with an exemplary embodiment, the at least one model may include at least one from among a natural language processing model, a machine learning model, a mathematical model, a process model, and a data model.

According to an aspect of the present disclosure, a non-transitory computer readable storage medium storing instructions for facilitating automated data curation in real-time is disclosed. The storage medium including executable code which, when executed by a processor, may cause the processor to retrieve at least one electronic document from a source; convert the at least one electronic document into at least one data set, the at least one data set may correspond to a predetermined format; preprocess the at least one data set to identify at least one linguistic unit, the at least one linguistic unit may relate to at least one from among a paragraph and a sentence; extract, by using at least one model, at least one attribute based on the at least one linguistic unit, the at least one attribute may relate to a key detail in the at least one electronic document; and generate, in real-time, at least one message based on the extracted at least one attribute.

In accordance with an exemplary embodiment, the at least one electronic document may include a corporate action prospectus that provides information for a corresponding corporate event, the information may include at least one from among term and condition information, date information, and restriction information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
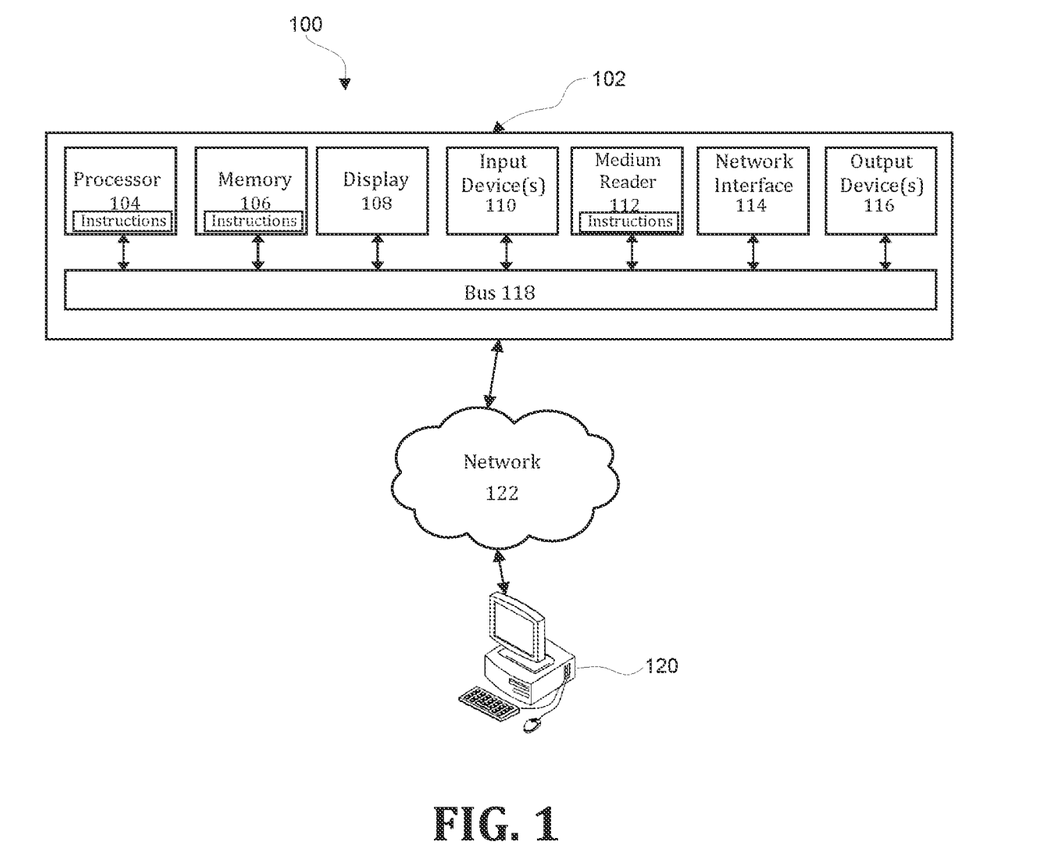
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated curation of prospectus and narrative data in real-time by using natural language processing, expression patterns, and scoring algorithms.

Figure 2:
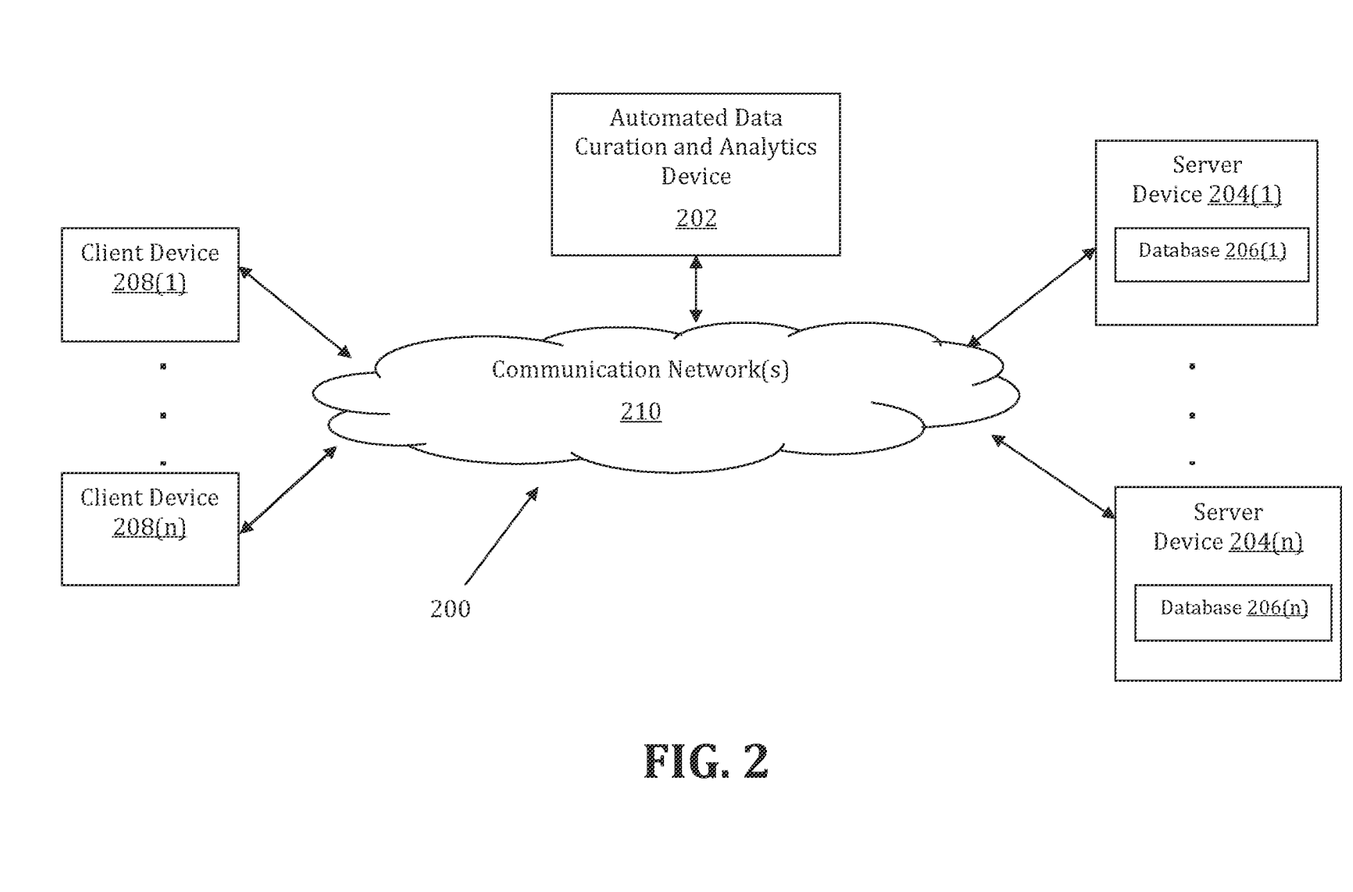
FIG. 2 illustrates an exemplary diagram of a network environment.

Referring to FIG. 2, a schematic of an exemplary network environment 200 for implementing a method for facilitating automated curation of prospectus and narrative data in real-time by using natural language processing, expression patterns, and scoring algorithms is illustrated. In an exemplary embodiment, the method is executable on any networked computer platform, such as, for example, a personal computer (PC).

The method for facilitating automated curation of prospectus and narrative data in real-time by using natural language processing, expression patterns, and scoring algorithms may be implemented by an Automated Data Curation and Analytics (ADCA) device 202. The ADCA device 202 may be the same or similar to the computer system 102 as described with respect to FIG. 1. The ADCA device 202 may store one or more applications that can include executable instructions that, when executed by the ADCA device 202, cause the ADCA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADCA device 202 itself, may be located in virtual server(s) running in a cloud-based computing environment rather than being tied to one or more specific physical network computing devices. Also, the application(s) may be running in one or more virtual machines (VMs) executing on the ADCA device 202. Additionally, in one or more embodiments of this technology, virtual machine(s) running on the ADCA device 202 may be managed or supervised by a hypervisor.

In the network environment 200 of FIG. 2, the ADCA device 202 is coupled to a plurality of server devices 204(1)-204(n) that hosts a plurality of databases 206(1)-206(n), and also to a plurality of client devices 208(1)-208(n) via communication network(s) 210. A communication interface of the ADCA device 202, such as the network interface 114 of the computer system 102 of FIG. 1, operatively couples and communicates between the ADCA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADCA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ADCA devices that efficiently implement a method for facilitating automated curation of prospectus and narrative data in real-time by using natural language processing, expression patterns, and scoring algorithms.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADCA device 202 may be a standalone device or integrated with one or more other devices or apparatuses, such as one or more of the server devices 204(1)-204(n), for example. In one particular example, the ADCA device 202 may include or be hosted by one of the server devices 204(1)-204(n), and other arrangements are also possible. Moreover, one or more of the devices of the ADCA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ADCA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to electronic documents, data sets, predetermined formats, linguistic units, paragraphs, sentences, natural language processing models, attributes, key details, and message narratives.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADCA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ADCA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ADCA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADCA device 202, the server devices 204(1)-204(n), or the client devices 208(1)-208(n), for example, may be configured to operate as virtual instances on the same physical machine. In other words, one or more of the ADCA device 202, the server devices 204(1)-204(n), or the client devices 208(1)-208(n) may operate on the same physical device rather than as separate devices communicating through communication network(s) 210. Additionally, there may be more or fewer ADCA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
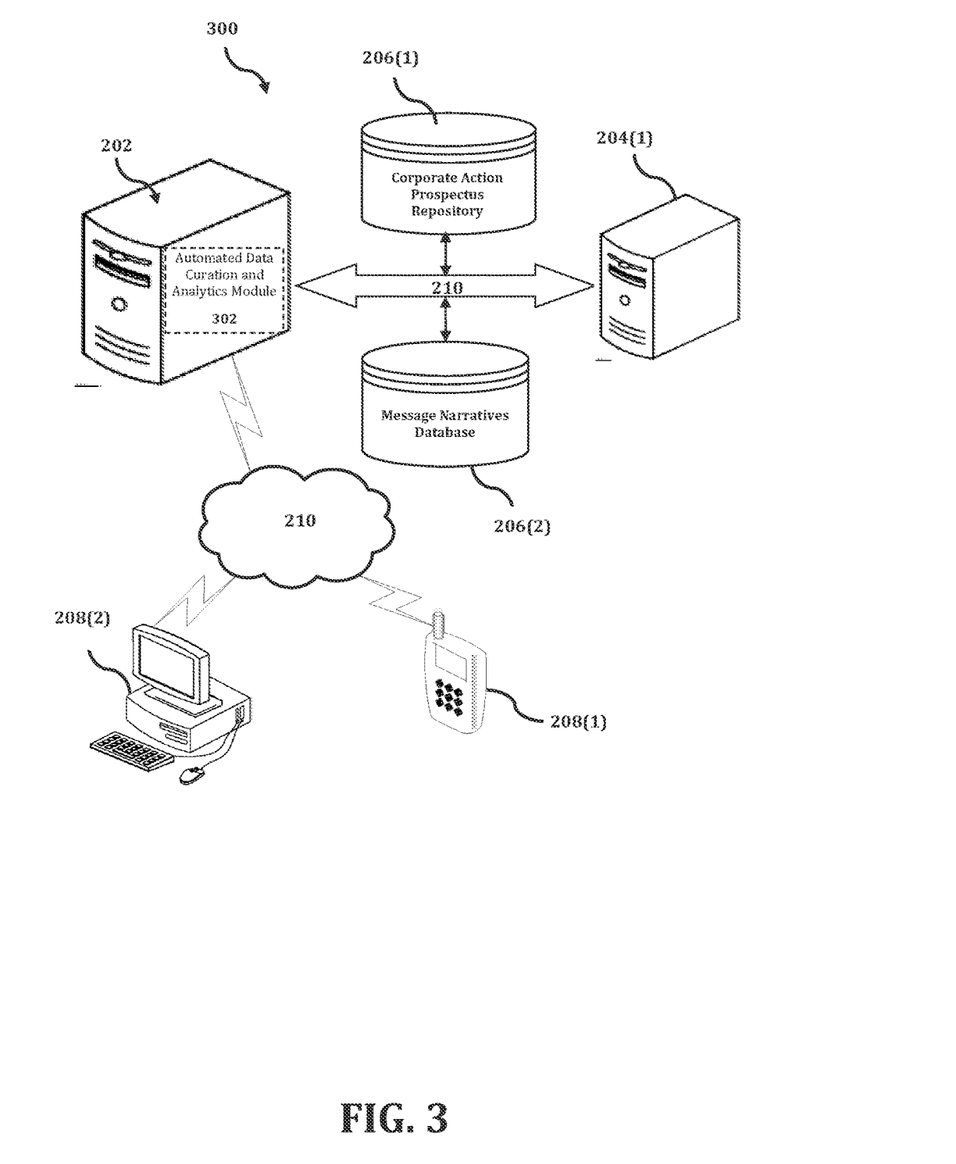
FIG. 3 shows an exemplary system for implementing a method for facilitating automated curation of prospectus and narrative data in real-time by using natural language processing, expression patterns, and scoring algorithms.

The ADCA device 202 is described and shown in FIG. 3 as including an automated data curation and analytics module 302, although it may include other rules, policies, modules, databases, or applications, for example. As will be described below, the automated data curation and analytics module 302 is configured to implement a method for facilitating automated curation of prospectus and narrative data in real-time by using natural language processing, expression patterns, and scoring algorithms.

An exemplary process 300 for implementing a mechanism for facilitating automated curation of prospectus and narrative data in real-time by using natural language processing, expression patterns, and scoring algorithms by utilizing the network environment of FIG. 2 is shown as being executed in FIG. 3. Specifically, a first client device 208(1) and a second client device 208(2) are illustrated as being in communication with ADCA device 202. In this regard, the first client device 208(1) and the second client device 208(2) may be "clients" of the ADCA device 202 and are described herein as such. Nevertheless, it is to be known and understood that the first client device 208(1) and/or the second client device 208(2) need not necessarily be "clients" of the ADCA device 202, or any entity described in association therewith herein. Any additional or alternative relationship may exist between either or both of the first client device 208(1) and the second client device 208(2) and the ADCA device 202, or no relationship may exist.

Further, ADCA device 202 is illustrated as being able to access a corporate action prospectus repository 206(1) and a message narratives database 206(2). The automated data curation and analytics module 302 may be configured to access these databases for implementing a method for facilitating automated curation of prospectus and narrative data in real-time by using natural language processing, expression patterns, and scoring algorithms.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ADCA device 202 via broadband or cellular communication. Of course, these embodiments are merely exemplary and are not limiting or exhaustive.

Upon being started, the automated data curation and analytics module 302 executes a process for facilitating automated curation of prospectus and narrative data in real-time by using natural language processing, expression patterns, and scoring algorithms. An exemplary process for facilitating automated curation of prospectus and narrative data in real-time by using natural language processing, expression patterns, and scoring algorithms is generally indicated at flowchart 400 in FIG. 4.

Figure 4:
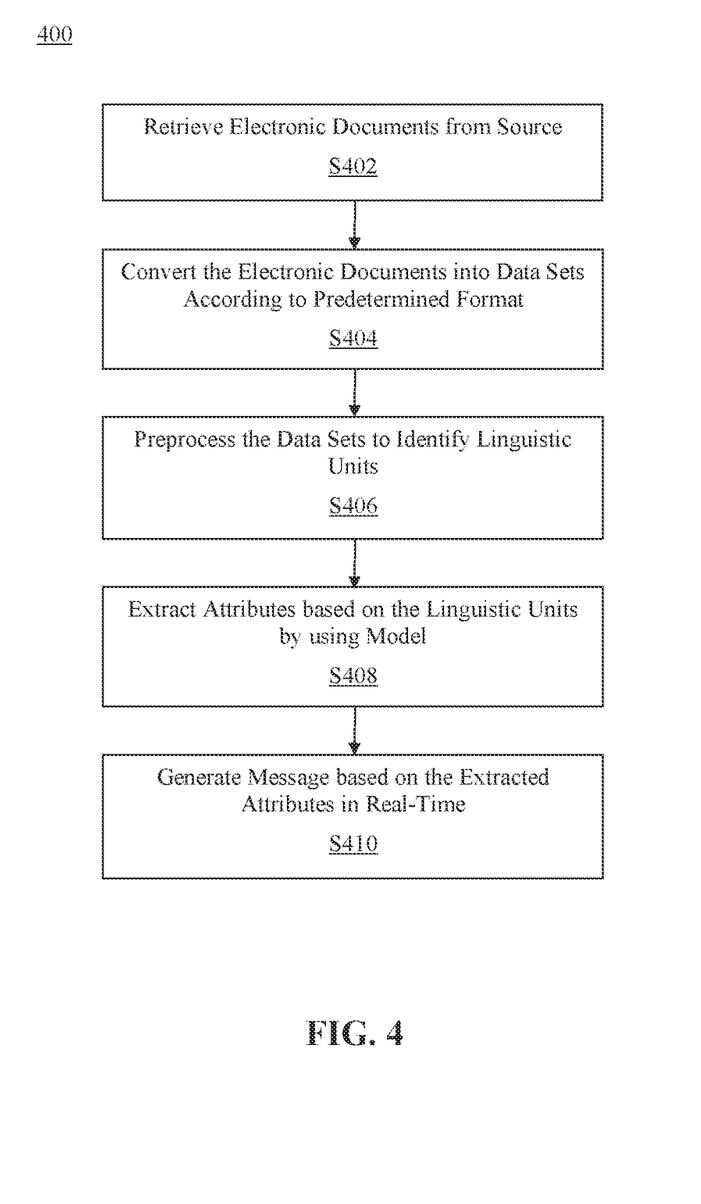
FIG. 4 is a flowchart of an exemplary process for implementing a method for facilitating automated curation of prospectus and narrative data in real-time by using natural language processing, expression patterns, and scoring algorithms.

In the process 400 of FIG. 4, at step S402, electronic documents may be retrieved from a source. The electronic document may be retrieved via an interface such as, for example, an application programming interface (API). In an exemplary embodiment, the electronic documents may include a corporate action prospectus that provides information for a corresponding corporate event. The information may include at least one from among term and condition information, data information, and restriction information.

In another exemplary embodiment, the corporate action prospectus may include a formal legal document that is designed to provide information and full details about a corresponding corporate event. The corporate action prospectus may be voluntarily provided by the entity based on business guidelines as well as required to be disclosed by a regulatory authority. For example, a publicly traded entity may be required to file the corporate action prospectus with the U.S. Securities and Exchange Commission (SEC).

In another exemplary embodiment, the corporate event may relate to a corporate action by an entity that brings material change to the entity and affects stakeholders such as, for example, shareholders and bondholders. For example, when a publicly traded entity issues a corporate action, the entity is initiating a process that directly affects the securities issued by the entity. The corporate event may correspond to pressing financial matters such as, for example, a bankruptcy and a liquidation, as well as asset related actions such as, for example, dividend changes and stock splits.

In another exemplary embodiment, the electronic documents may be automatically retrieved via the API. The electronic documents may be automatically retrieved based on a predetermined schedule as well as based on an indication from the source. For example, the electronic documents may be automatically retrieved via the API in response to a notification from the source that a new corporate action prospectus is available for retrieval. Similarly, for example, the electronic documents may be automatically retrieved on a weekly basis according to a publishing schedule.

In another exemplary embodiment, the electronic documents may be manually retrieved for input into the claimed invention via a graphical user interface. The graphical user interface may include graphical elements that are user interactable to input the electronic documents. For example, an administrator may interact with the graphical user interface to provide the new corporate action prospectus for further processing consistent with present disclosures.

In another exemplary embodiment, the source may include a first-party data source. The first-party data source may include entities offering the corporate action prospectus for a corporate event corresponding to the entity. For example, company A may provide a corporate action prospectus for an upcoming corporate event that includes company A.

In another exemplary embodiment, the source may include a third-party data source. The third-party data source may include data aggregators that provide a plurality of corporate action prospectuses for a plurality of corporate events from many different entities. For example, data aggregator B may provide corporate action prospectuses for upcoming corporate events of company C, company D, and company E. In another exemplary embodiment, the third-party data source may include a regulatory authority that requires entities to file corporate action prospectuses. For example, the regulatory authority may include the U.S. SEC.

At step S404, the electronic documents may be converted into a plurality of data sets. The data sets may correspond to a predetermined format. In an exemplary embodiment, the predetermined format may include a machine-readable text format that is automatically processable by a computing device. The machine-readable text format may include textual data in a markup language that facilitates recognition by the computing device.

In another exemplary embodiment, the electronic documents may be automatically parsed and mapped to facilitate the conversion. The conversion may include electronic and/or mechanical conversions such as, for example, optical character recognition of images of typed, handwritten, and printed text into machine-encoded text. For example, the parsing and the mapping of the electronic documents may enable the structuring of data in the electronic documents as a structured data set.

In another exemplary embodiment, the electronic documents may be parsed to determine whether conversion of the data is required. When conversion is not required, the electronic documents may be automatically passed to the next processing step consistent with present disclosures. For example, parsing the electronic documents may reveal that the electronic documents are in a portable document format (PDF) with machine-readable text, which does not require additional conversion.

At step S406, the data sets may be preprocessed to identify a plurality of linguistic units. In an exemplary embodiment, data preprocessing may relate to manipulation of the data sets prior to analysis to improve analytical performance. The data sets may be manipulated to transform raw data into structured data. For example, the data sets may be preprocessed to clean the textual data as well as split the textual data into paragraphs and sentences.

In another exemplary embodiment, the plurality of linguistic units may correspond to a natural unit in a language such as, for example, an English language into which linguistic messages can be analyzed. The plurality of linguistic units may relate to a linguistic expression that corresponds to at least one from among a paragraph and a sentence. In another exemplary embodiment, each of the plurality of linguistic units may correspond to a single word as well as to a string of words that express a complete thought. The string of words may together correspond to a linguistical unit that includes a subject and a predicate.

In another exemplary embodiment, the data sets may be preprocessed by standardizing character spacing of the textual data in the data sets. The standardizing of the character spacing may relate to an optically consistent adjustment to each of the linguistic units to change a visual density of the textual data. Then, in another exemplary embodiment, non-standard textual characters may be removed from the data sets as part of the preprocessing. The non-standard textual characters may be determined based on at least one from among a character encoding guideline for electronic communication such as, for example, an American Standard Code for Information Interchange (ASCII) standard and a character compliance guideline for financial messages such as, for example, a Society for Worldwide Interbank Financial Telecommunication (SWIFT) standard.

At step S408, attributes may be automatically extracted based on the linguistic units. The attributes may be automatically extracted by using a model. In an exemplary embodiment, the attributes may relate to key details in the electronic document. The key details may relate to pertinent information that corresponds to the corporate event. Consistent with present disclosures, the key details may include date details, restriction details, as well as terms and condition details.

In another exemplary embodiment, the attributes may be extracted by using the model to identify the attributes from the linguistic units. The attributes may be identified based on at least one from among a predetermined expression pattern and a keyword lookup. Then, each of the identified attributes may be scored by using the model. The attributes may be scored based on predetermined criteria. The predetermined criteria may include at least one from among a keyword hit criterion, a context criterion, a word clustering criterion, and a word embedding criterion. The identified attributes may be extracted based on a result of the scoring and predetermined scoring thresholds.

In another exemplary embodiment, the model may include at least one from among a natural language processing model, a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S410, messages may be generated based on the extracted attributes. The messages may be generated in real-time in response to and corresponding with the retrieved electronic documents. In an exemplary embodiment, the messages may relate to a message narrative such as, for example, a SWIFT message narrative that includes information corresponding to a corporate action event. The information may include at least one from among election information, entitlement information, and event instruction information.

In another exemplary embodiment, the message narratives may include electronic messages such as, for example, message type 564 (MT564) messages. The MT564 messages may be sent by an account servicer such as, for example, an account servicing institution to an account owner and/or a designated agent. The MT564 message may be used to provide an account owner with details of the impact a corporate action event will have on a safekeeping and/or cash account such as, for example, an impact to entitlement calculations. The MT564 may also be used to provide the account owner with preliminary advice for upcoming postings as well as for reversal of securities and/or cash postings.

In another exemplary embodiment, the message narratives may include electronic messages such as, for example, message type 568 (MT568) messages. The MT568 messages may be sent between an account owner and an account servicer such as, for example, an account servicing institution. The MT568 message may be bi-directional and may be used to provide complex instructions and/or narrative details relating to a corporate action event.

Accordingly, with this technology, an optimized process for facilitating automated curation of prospectus and narrative data in real-time by using natural language processing, expression patterns, and scoring algorithms is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated data curation in real-time, the method being implemented by at least one processor, the method comprising:

generating, by the at least one processor, at least one model by using a genetic algorithm;

training, by the at least one processor using training data, the at least one model;

assessing, by the at least one processor, the at least one model to determine that at least one rate is within a predetermined range;

deploying, by the at least one processor, the at least one model based on a result of the assessment;

retrieving, by the at least one processor, at least one electronic document from a source;

parsing, by the at least one processor, the at least one electronic document to determine that a conversion action is required;

converting, by the at least one processor, the at least one electronic document into at least one data set, the at least one data set corresponding to a predetermined format;

preprocessing, by the at least one processor, the at least one data set to identify at least one linguistic unit, the at least one linguistic unit relating to at least one from among a paragraph and a sentence;

extracting, by the at least one processor using the at least one model, at least one attribute based on the at least one linguistic unit, the at least one attribute relating to a key detail in the at least one electronic document; and generating, by the at least one processor in real-time, at least one message based on the extracted at least one attribute, the at least one message including a bi-directional message that provides instructions and narrative details that relate to the at least one electronic document.

2. The method of claim 1, wherein the at least one electronic document includes a corporate action prospectus that provides information for a corresponding corporate event, the information including at least one from among term and condition information, date information, and restriction information.

3. The method of claim 1, wherein the predetermined format includes a machine-readable text format that is automatically processable by a computing device, the machine-readable text format including textual data in a markup language that facilitates recognition by the computing device.

4. The method of claim 1, wherein preprocessing the at least one data set further comprises:

standardizing, by the at least one processor, character spacing in the at least one data set; and removing, by the at least one processor, at least one non-standard textual character from the at least one data set.

5. The method of claim 4, wherein the standardizing relates to an optically consistent adjustment to each of the at least one linguistic unit to change a visual density of textual data.

6. The method of claim 4, wherein the at least one non-standard textual character is determined based on at least one from among a character encoding guideline for electronic communication and a character compliance guideline for financial messages.

7. The method of claim 1, wherein extracting the at least one attribute further comprises:

identifying, by the at least one processor using the at least one model, the at least one attribute from the at least one linguistic unit based on at least one from among a predetermined expression pattern and a keyword lookup;

scoring, by the at least one processor using the at least one model, each of the at least one identified attribute based on at least one predetermined criterion, the at least one predetermined criterion including at least one from among a keyword hit criterion, a context criterion, a word clustering criterion, and a word embedding criterion; and extracting, by the at least one processor, the identified at least one attribute based on a result of the scoring and at least one predetermined scoring threshold.

8. The method of claim 1, wherein the at least one message relates to a message narrative that includes information corresponding to a corporate action event, the information including at least one from among election information, entitlement information, and event instruction information.

9. The method of claim 1, wherein the at least one model includes at least one from among a natural language processing model, a machine learning model, a mathematical model, a process model, and a data model.

10. A computing device configured to implement an execution of a method for facilitating automated data curation in real-time, the computing device comprising:

a processor;

a memory; and a communication interface coupled to each of the processor and the memory, wherein the processor is configured to:

generate at least one model by using a genetic algorithm;

train, by using training data, the at least one model;

assess the at least one model to determine that at least one rate is within a predetermined range;

deploy the at least one model based on a result of the assessment;

retrieve at least one electronic document from a source;

parse the at least one electronic document to determine that a conversion action is required;

convert the at least one electronic document into at least one data set, the at least one data set corresponding to a predetermined format;

preprocess the at least one data set to identify at least one linguistic unit, the at least one linguistic unit relating to at least one from among a paragraph and a sentence;

extract, by using the at least one model, at least one attribute based on the at least one linguistic unit, the at least one attribute relating to a key detail in the at least one electronic document; and generate, in real-time, at least one message based on the extracted at least one attribute, the at least one message including a bi-directional message that provides instructions and narrative details that relate to the at least one electronic document.

11. The computing device of claim 10, wherein the at least one electronic document includes a corporate action prospectus that provides information for a corresponding corporate event, the information including at least one from among term and condition information, date information, and restriction information.

12. The computing device of claim 10, wherein the predetermined format includes a machine-readable text format that is automatically processable by the computing device, the machine-readable text format including textual data in a markup language that facilitates recognition by the computing device.

13. The computing device of claim 10, wherein, to preprocess the at least one data set, the processor is further configured to:

standardize character spacing in the at least one data set; and remove at least one non-standard textual character from the at least one data set.

14. The computing device of claim 13, wherein the standardizing relates to an optically consistent adjustment to each of the at least one linguistic unit to change a visual density of textual data.

15. The computing device of claim 13, wherein the processor is further configured to determine the at least one non-standard textual character based on at least one from among a character encoding guideline for electronic communication and a character compliance guideline for financial messages.

16. The computing device of claim 10, wherein, to extract the at least one attribute, the processor is further configured to:
- identify, by using the at least one model, the at least one attribute from the at least one linguistic unit based on at least one from among a predetermined expression pattern and a keyword lookup;
- score, by using the at least one model, each of the at least one identified attribute based on at least one predetermined criterion, the at least one predetermined criterion including at least one from among a keyword hit criterion, a context criterion, a word clustering criterion, and a word embedding criterion; and
- extract the identified at least one attribute based on a result of the scoring and at least one predetermined scoring threshold.

17. The computing device of claim 10, wherein the at least one message relates to a message narrative that includes information corresponding to a corporate action event, the information including at least one from among election information, entitlement information, and event instruction information.

18. The computing device of claim 10, wherein the at least one model includes at least one from among a natural language processing model, a machine learning model, a mathematical model, a process model, and a data model.

19. A non-transitory computer readable storage medium storing instructions for facilitating automated data curation in real-time, the storage medium comprising executable code which, when executed by a processor, causes the processor to:
- generate at least one model by using a genetic algorithm;
- train, by using training data, the at least one model;
- assess the at least one model to determine that at least one rate is within a predetermined range;
- deploy the at least one model based on a result of the assessment;
- retrieve at least one electronic document from a source;
- parse the at least one electronic document to determine that a conversion action is required;
- convert the at least one electronic document into at least one data set, the at least one data set corresponding to a predetermined format;
- preprocess the at least one data set to identify at least one linguistic unit, the at least one linguistic unit relating to at least one from among a paragraph and a sentence;
- extract, by using the at least one model, at least one attribute based on the at least one linguistic unit, the at least one attribute relating to a key detail in the at least one electronic document; and
- generate, in real-time, at least one message based on the extracted at least one attribute, the at least one message including a bi-directional message that provides instructions and narrative details that relate to the at least one electronic document.

20. The storage medium of claim 19, wherein the at least one electronic document includes a corporate action prospectus that provides information for a corresponding corporate event, the information including at least one from among term and condition information, date information, and restriction information.

* * * * *